United States Patent [19]
Walter et al.

[11] Patent Number: 6,041,811
[45] Date of Patent: Mar. 28, 2000

[54] PLUG FOR FORMING AN ICE BARRIER IN A PIPELINE

[75] Inventors: Bronislav Walter; Donald D. Savard; Jaromir Friedrich, all of Edmonton, Canada

[73] Assignee: PA-Plug, Inc., Edmonton, Canada

[21] Appl. No.: 09/144,958

[22] Filed: Sep. 1, 1998

[30]    Foreign Application Priority Data

Sep. 4, 1997 [CA] Canada ................................. 2214666
 Mar. 10, 1998 [CA] Canada ................................. 2231609

[51] Int. Cl.[7] ................................................. F04F 10/00
[52] U.S. Cl. ............................... 137/334; 62/293; 138/89
[58] Field of Search .......................... 137/334; 62/293, 62/66; 138/97, 89, 90; 285/15, 41

[56]    References Cited

U.S. PATENT DOCUMENTS

| | | | |
|---|---|---|---|
| 4,220,012 | 9/1980 | Brister | 62/130 |
| 4,416,118 | 11/1983 | Brister | 62/66 |
| 4,433,556 | 2/1984 | Brady | 62/293 |
| 4,487,643 | 12/1984 | Ellett | 156/80 |
| 4,598,727 | 7/1986 | Schroder | 137/334 |
| 4,956,042 | 9/1990 | Hubert et al. | 156/344 |
| 4,963,205 | 10/1990 | Hubert | 156/80 |
| 5,560,394 | 10/1996 | Jorgensen | 138/89 |
| 5,608,159 | 3/1997 | Carcone et al. | 73/49.8 |
| 5,680,770 | 10/1997 | Hall et al. | 62/293 |
| 5,771,937 | 6/1998 | Collins | 138/90 |

FOREIGN PATENT DOCUMENTS

WO 85/02816  7/1985  WIPO .

*Primary Examiner*—David J. Walczak
*Attorney, Agent, or Firm*—David L. Davis

[57]    ABSTRACT

An ice plug for defining a barrier in a pipeline section filled with water, comprises a hollow, cylindrical body enclosed at a front end and provided with guide means for sliding movement of the plug along and within the pipeline. The body has a diameter smaller than that of the pipeline to define with the latter an annular interspace enclosed at opposed axial ends of the plug. The thickness of the annular space is selected to allow free movement of the body through curves in a pipeline and to form a continuous, annular ice layer firmly engaging the inside wall of the pipeline and the outer surface of said body to thus form, together with the body, a temporary water impermeable barrier within the pipeline. A water supply system fills the interspace with process water.

23 Claims, 7 Drawing Sheets

6,041,811

PLUG FOR FORMING AN ICE BARRIER IN A PIPELINE

BACKGROUND OF THE INVENTION

1. Field of Invention

The present invention relates to pipeline plugs and in particular to apparatus or plug useful in forming a solid phase or ice plug in a pipeline for maintenance, pressure testing or the like purposes where a section of a pipeline is to be isolated from the rest of the pipeline.

2. Prior Art

The technique of forming solid phase plugs for isolation purposes of pipelines using liquid nitrogen as cooling media is described in U.S. Pat. No. 4,220,012 issued Sep. 2, 1980. It employs a chamber placed over the line pipe surface. The chamber is then filled with liquid nitrogen. The charge is agitated to induce boiling thus increasing heat flow from the line pipe to the evaporating nitrogen. This method uses pipeline fluid or water to form a solid phase plug. The time to form solid phase plug using this method is long because the ice which forms the plug occupies the full section of the line pipe. The apparatus of the present invention is also referred to in the art of pipeline maintenance or testing as an "icepig" or an "ice plug".

SUMMARY OF THE INVENTION

It is an object of the present invention to advance the art of freezing a barrier inside a pipeline. In particular, the object is to shorten the time required for forming an effective solid phase plug thus reducing the pipeline shutdown.

In general terms, the ice plug of the invention includes a hollow, generally cylindrical body enclosed at least at a front end. The body is provided with guide means for sliding movement of the plug along and within the pipeline. The outer diameter of the body is smaller than that of the inside of the pipeline. In operation, the body defines with the pipeline an annular interspace which is enclosed at opposed axial ends of the plug. Water supply means is provided for filling said interspace with process water to be frozen to form an annular ice layer. Thus, the annular ice layer forms, together with the rest of the body, a temporary water impermeable barrier or plug within the pipeline.

BRIEF DESCRIPTION OF THE DRAWINGS

The invention will be described in greater detail with reference to the accompanying diagrammatic, not-to-scale drawings, wherein.

DETAILED DESCRIPTION

Figure 1:
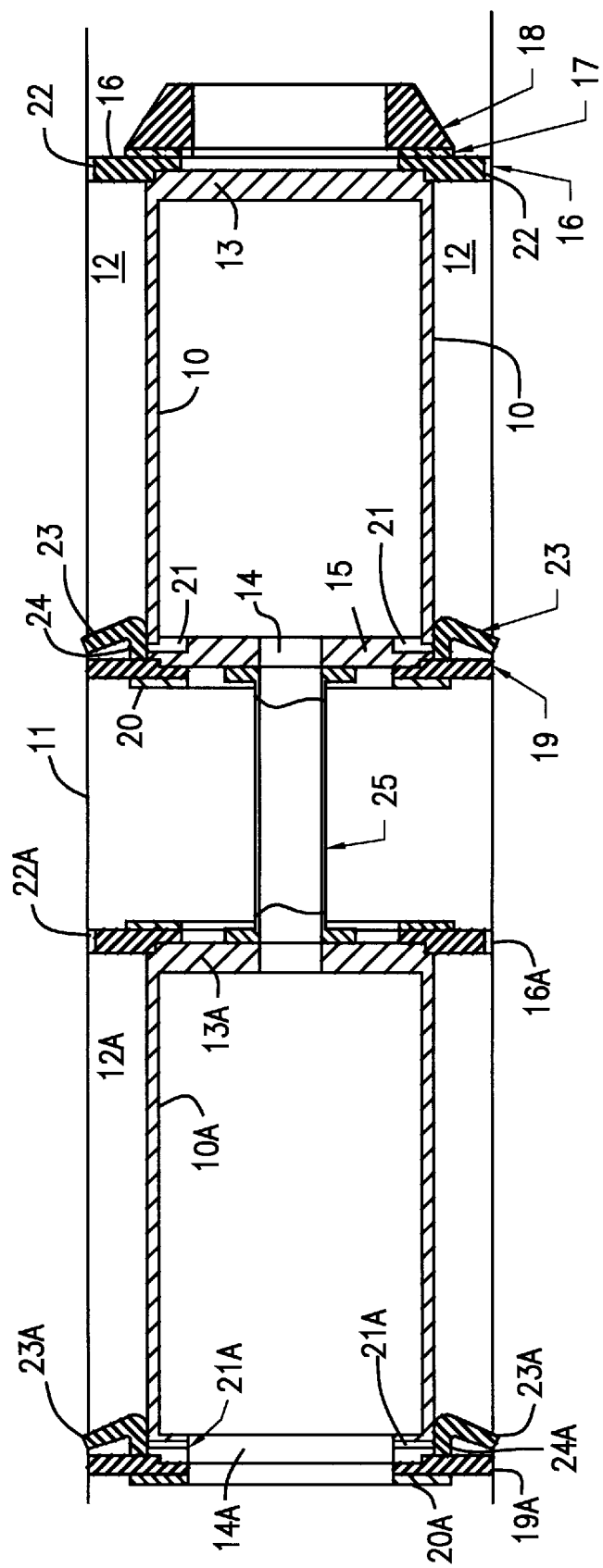
FIG. 1 is a diagrammatic representation of a longitudinal sectional view of a first embodiment of the apparatus of the present invention at the point where the apparatus has just reached a desired location of the pipeline.
Figure 2:
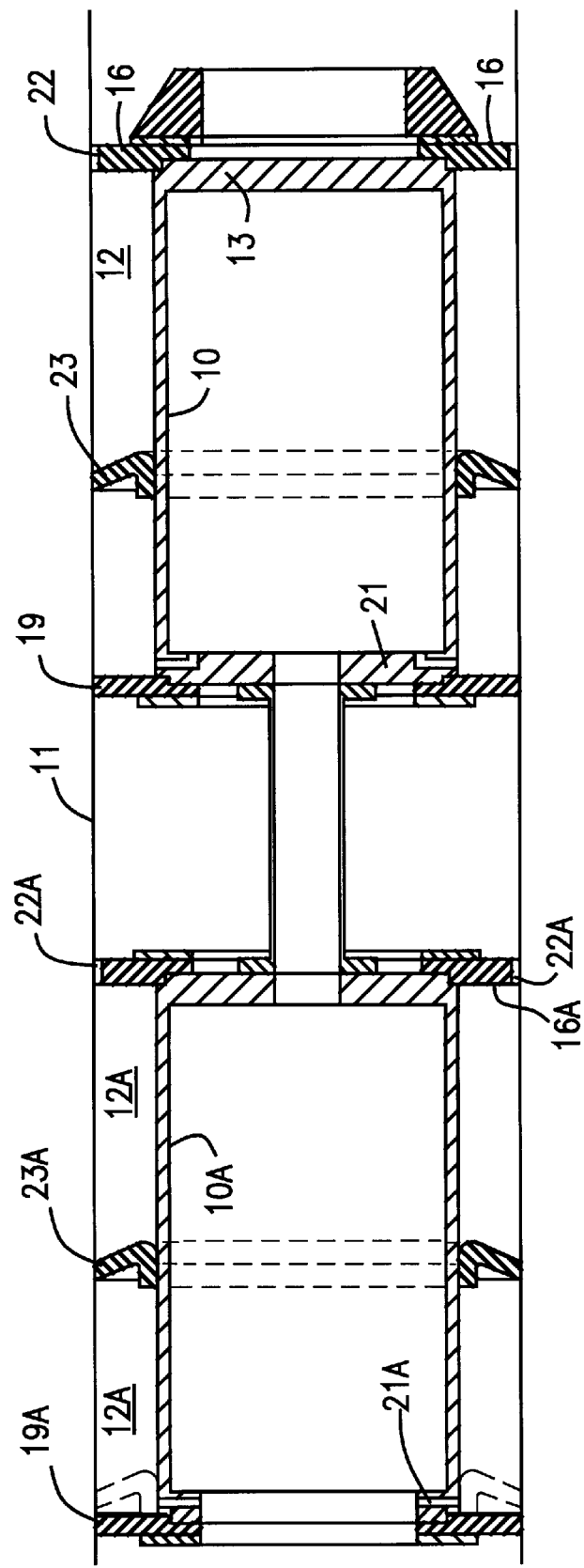
FIG. 2 is a view similar to FIG. 1 but showing the apparatus half way through the cycle of filling the interspace with water.
Figure 3:
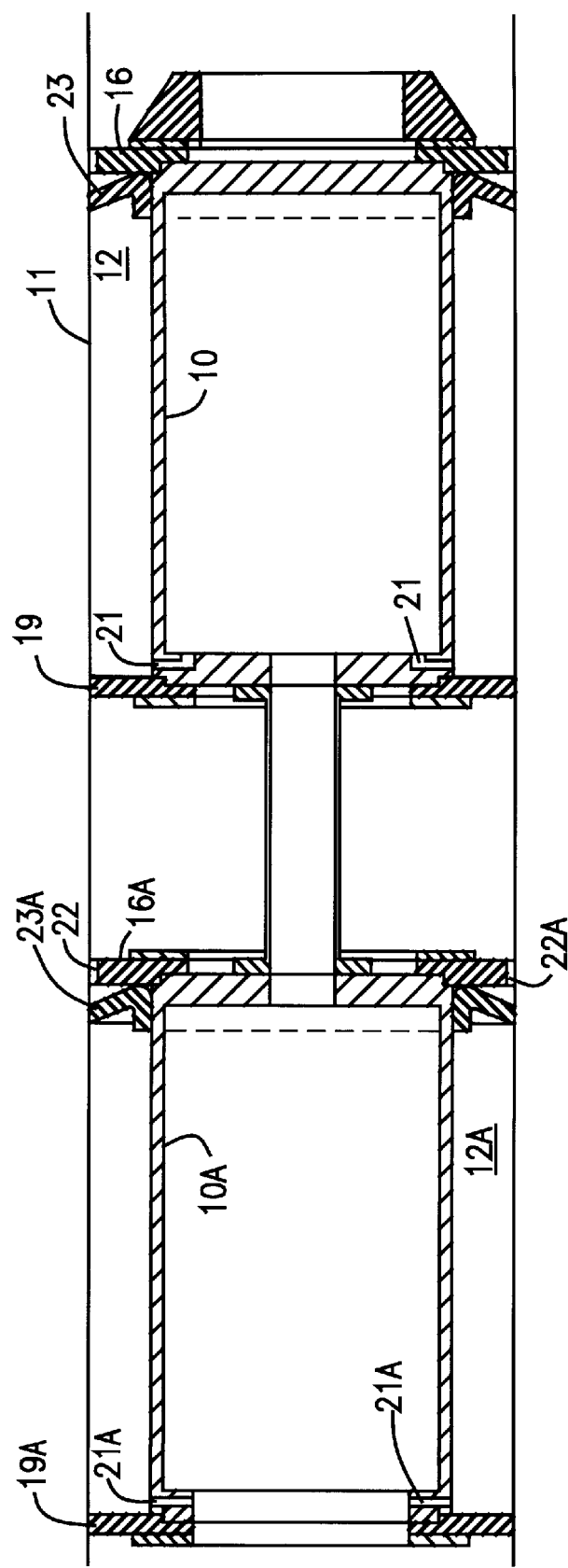
FIG. 3 is a view similar to that of FIG. 1 but showing the apparatus at a stage where the interspace is filled with water and the apparatus is ready to be exposed to the freezing of the water charge in the interspace.

Turning now to the embodiment of FIGS. 1–3, reference number 10 designates a hollow, generally cylindric body disposed within a pipeline section 11. The pipeline 11 is filled with water introduced after evacuation of the liquid or gas normally transported through same, e.g. oil. The outside diameter of the body 10 is smaller than the inside diameter of the pipeline 11. This results in the formation of an annular interspace 12. The thickness, i.e. the radial distance between the exterior of the body 10 and the inside wall of the line pipe 11, is predetermined according to instant conditions. As an example, the inside diameter of the pipe 11 may be within the range of about 12" to about 60". The outside diameter of the body 10 is designed to permit free movement of the plug through a pipeline at a minimum radius of the curves of the pipeline which is about 3D, where D is the diameter of the pipeline. The body 10 must have the diameter securing free passage through such a curve. The front end of the body 10 is closed by a solid front wall 13 while the rear end thereof is open at an opening 14 disposed centrally of the rear wall 15.

Fixedly secured to the front end portion near the front wall 13 is a first ring 16, also referred to as a "bidirectional ring 16." This is effected, for instance, by a retaining ring 17 held in place by a set of bolts (not shown) passing through an annular bumper 18 at the forward extreme of the plug. The bumper, like the ring 16, is made from a suitable resilient polymeric material, preferably rubber. The outside diameter of the ring 16 corresponds to the inside diameter of the pipe 11 for slidably guiding the body 10 through the pipe 11 in either axial direction.

A second ring 19 is fixedly secured to the rear end portion of the body, by way of a retainer ring 20 and bolts, the latter not being shown for simplicity. Like the first ring 16, the second ring 19, also referred to as "a bidirectional ring 19," is made from a resilient polymeric material. The second ring 19 is similar in structure to the first ring 16 even though it has an additional function of scraping or sweeping the inside of the pipe 11 as will be described. Therefore, the second ring 19 may also be referred to as "a scraper ring 19" even though its primary function is to slidably guide the rear end portion of the body 10 through the pipe 11 in either axial direction. The drawings show that the rings 16 and 19 form axial ends of the interspace 12.

A number of process water inlet ports 21 (generally referred to as inlet port means) is provided at the rear wall 15. The ports 21 communicate the interspace 12 with a source of clean process water. In the embodiment of FIGS. 1–3, the source of clean process water is the interior of the body 10 which is normally filled with water.

The plug of the invention includes water supply means for selectively drawing clean water into the interspace 12. A first embodiment of such water supply means will now be described in detail.

The embodiment of FIGS. 1–3 has discharge ports 22 in the ring 16. Water can be discharged through the ports 22 from the interspace 12 to the exterior of the plug. A braking ring 23 is slidably mounted in watertight fashion on the exterior of the body 10. The outer diameter of the ring 23, which is larger than the inside diameter of the pipe 10, together with the frustoconical configuration of the ring 23 provide a braking effect relative to the pipe 11. In particular, with the arrangement shown, the ring 23 can slide in the forward direction, i.e. from the left to the right of FIG. 1, but when urged to move in a reversed direction it tends to spread outwardly due to its resiliency inherent to the polymeric material from which the ring 23 is made. As a result a dragging or braking effect resisting the displacement of the ring 23 in the rearward direction is present. This is contrary to the bidirectional rings 16, 19, both of which can smoothly slide, together with the body 10, in both directions. The rings 16, 19 or 23, 19 present end members defining axial ends of said interspace, depending on the instant stage of the cycle of filling the interspace with clean water, as will be described.

The braking ring 23 is integrally formed with an annular projection 24. It is shown in FIG. 1 that with the ring 23 at the rearmost position, the projection 24 blocks the ports 21. On the contrary, when the braking ring 23 is away from the rear end portion of the body 10 (FIGS. 2, 3), the ports 21 are open so that clean water can flow from the interior of the body 10 into the interspace 12.

It is one of the features of the embodiment of FIGS. 1–3 that where the pipeline pressures to be blocked are very high an auxiliary or tandem plug may be connected with the forward plug. The tandem plug is virtually identical in shape and function to the forward plug. The elements of the tandem plug are therefore referred to with identical reference numbers with designation A. The structure of the two plugs being virtually identical, it would be pointless to describe the arrangement of the tandem plug in detail. It will suffice to say that a flexible connection tube 25 is connected at its front end to the rear wall 15 of the front plug, and with its rear end to the front wall 13A of the tandem plug. The tube 25 thus hydraulically communicates the interiors of the bodies 10, 10A. The body 10A is fully open at the rear end thereof, where there is no counterpart to the rear wall 15.

Figure 4:
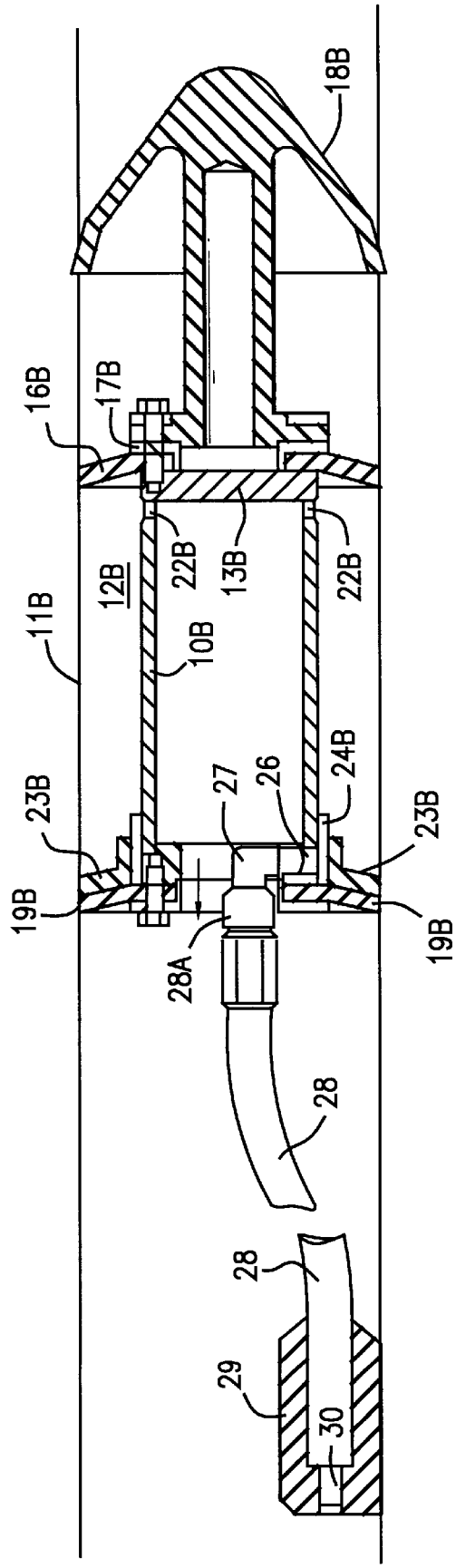
FIG. 4 is a longitudinal sectional view of an icepig of a second embodiment showing a modified way of supplying process or clean water to the annular interspace.
Figure 5:
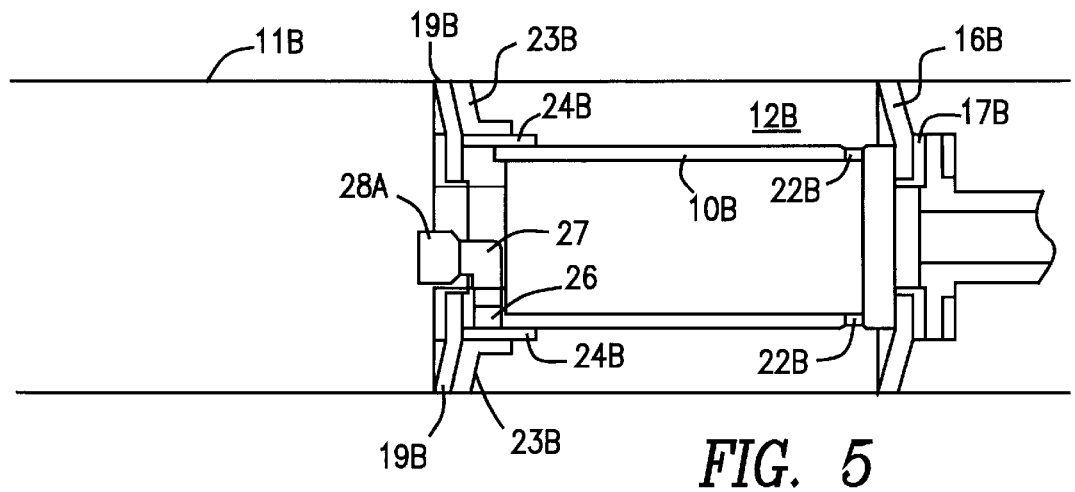
FIGS. 5, 6 and 7 are views of the cycle of filling the interspace with water, similar to FIGS. 1–3 but showing the icepig of the second embodiment of FIG. 4 with certain parts omitted for clarity.
Figure 6:
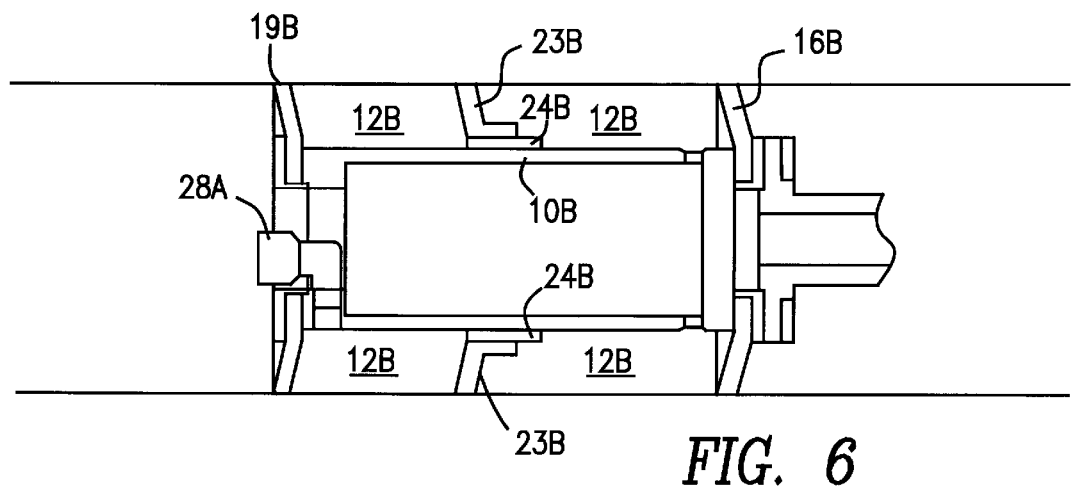
Figure 7:
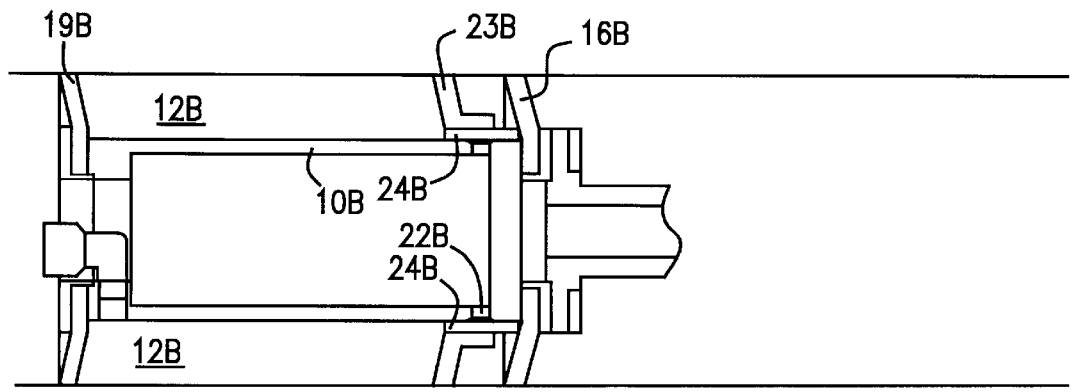

FIG. 4 shows another embodiment of the invention. Again, a substantial portion of the elements of this embodiment corresponds in shape and function to those of the first described embodiment and is therefore shown with reference to the same reference numbers with designation "B."

For instance, the body 10B is provided with the same type of guide means including the front bidirectional ring 16B and a rear scraping, bidirectional ring 19B. The detailed description of the parts corresponding to those of FIGS. 1–3 is therefore not provided except for the presence of the corresponding reference numbers with the letter B in FIGS. 4, 5, 6 and 7.

The difference from the first described embodiment is that the second embodiment has the braking ring 23B fixedly secured to a sliding sleeve 24B the inner surface of which slides along the exterior of the body 10B and is provided with sealing O-rings between the sleeve 24B and the outside of the body 10B.

A more substantial modification is in that the arrangement of a plurality of ports 21, 21A is replaced by a single port 26 which communicates over an elbow 27 having a fitting 28*a* to which is connected, in watertight fashion, a downstream end of a flexible hose 28. The upstream end of the hose 28 is provided with a ballast 29. An inlet port 30 in the ballast provides inlet for water from the bottom portion of the pipeline 11B. Thus, the fitting 28*a* can also be said to be "a fitting having an inlet portion open to the exterior of said plug at a rear end thereof (i.e. at the inlet 30), and a discharge end (elbow 27), communicating (through the port 26) with said interspace 12B at a point near the rear end of the plug."

Thus, the hose 28 presents an embodiment of a conduit with a ballast 29 adapted to maintain the upstream end of the conduit at vertically lowermost portion of the interior of the pipeline 11B, whereby water eventually drawn through the conduit and the fitting 28 into the interspace 12B is taken from the pipeline outside of the plug at a vertically lowermost location and therefore having a relatively small content of contaminants such as oil droplets or wax particles.

Those skilled in the art will readily recognize that the principle of the flexible hose with ballast can easily be adapted for use in the first described embodiment of FIGS. 1–3.

A further difference from the first embodiment is in that the discharge ports 22B at the front end of the body 10B hydraulically connect the interspace 12B with the interior of the body 10B, not with the exterior of the plug. It is to be noted that the fitting 28*a* occupies only a portion of the rear opening 14B of the body 10B so that the interior of the body 14B is in hydraulic communication with the water outside of the plug.

Figure 8:
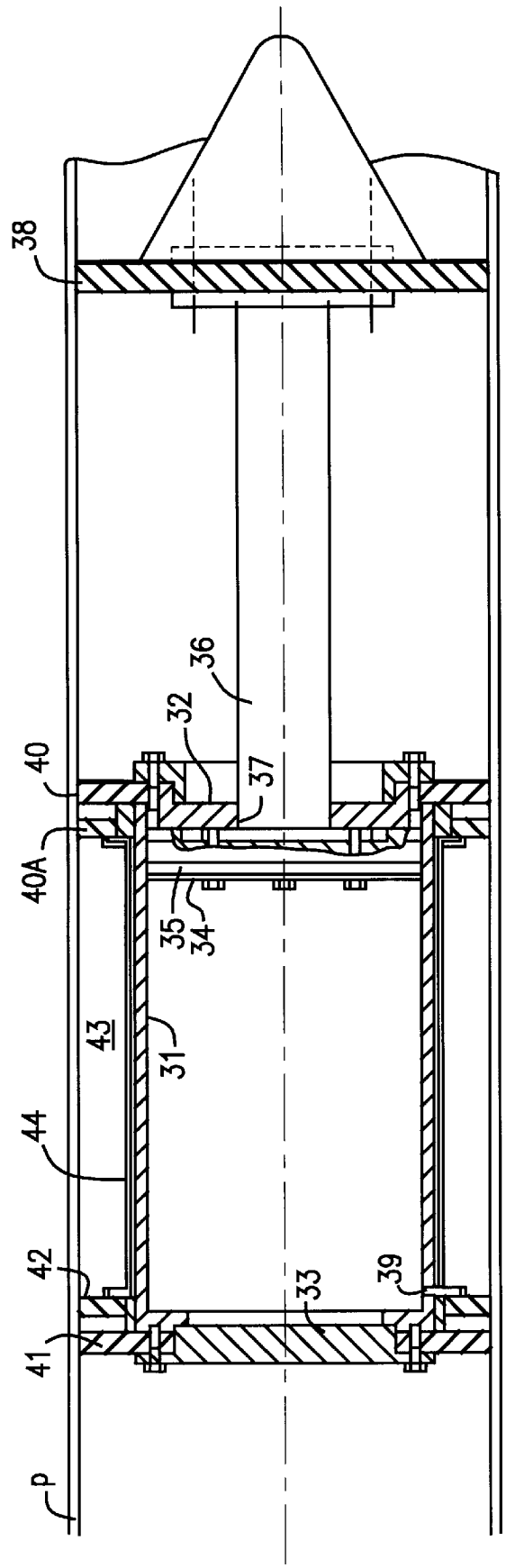
FIG. 8 is a longitudinal sectional view of yet another embodiment of the icepig of the present invention.

Turning now to the embodiment of FIG. 8, reference number 31 designates the body which is cylindric inside and preferably also outside. The hollow, cylindric body is closed in watertight fashion at its front end by an end plate 32. The rear end of the body 31 is likewise closed by a rear end wall 33. Disposed slidably within the body 31 is a piston 34 including piston seals 35. The forwards facing end of the piston 34 is provided with a flexible piston rod 36 which is slidable along the axis of the body 31 through an opening 37 in the front wall 32. The front end of the piston rod 36 is provided with a bidirectional ring 38 sealingly slidable within the pipeline P. The bidirectional ring 38 forms a piston ring of what is generally referred to as a solid, water impermeable forward piston assembly slidable relative to the interior surface of the pipeline. Accordingly, a pressure applied to the right hand face of the ring 38 and the remaining water impermeable members to which the ring 38 is secured, such as the conical bumper shown in contour only, results in pressure transmission to the piston 34 inside the body 31.

The body 31, which is filled with clean water defines a reservoir section for clean water which forms a part of an overall system of a source of clean process water. The body is provided near its rear end with one or more ports such as port 39, extending through the wall of the body 31. A braking guide ring 40 is fixedly secured to the body 31 at a front end thereof. A bidirectional guide ring 41 is secured to the body 31 at the rear end thereof. Further secured to the body 31 at the front and rear ends thereof are interspace end rings 40A, 42. Their inner faces co-operate with the inside wall of the pipeline P and with the outer wall of the body 31 to define an annular interspace 43. Generally, the rings 38, 40, 40A, 42 and 41 form what can also be generally referred to as "guide means for sliding movement of the plug along and within the pipeline."

A flexible, hose-like lining member 44 made of a suitable polymeric material, is secured at its ends in a watertight fashion to the rings 41,42. The interspace 43 has a thickness suitable for providing a solidified plug as described, while allowing the sliding of the plug through usual curved sections of the pipeline.

The size of the lining member 44 is determined such as to provide enough of material for extending radially between the rings 41, 42 and axially along the inner wall of the pipeline P and the outer wall of the body 31 (except the ports 39) to encompass all of the water coming through the port or ports 39 communicating the interior of the body 31 (i.e. clean water supply means) and filling the interspace 34. In general terms, therefore, there is a flexible, water impermeable distendable lining 44 within said interspace 43 between the body 31 and the inner surface of the wall of the pipeline P. The lining is hydraulically connected with said water supply means 31, 34, 39 at a discharge end of said filling port 39, whereby, on actuation of the piston means, the lining is distended by the process water and provides a water impermeable isolation of said interspace at the inner surface of the wall of the pipeline P.

The lining member is optional and may be omitted in certain applications.

Figure 9:
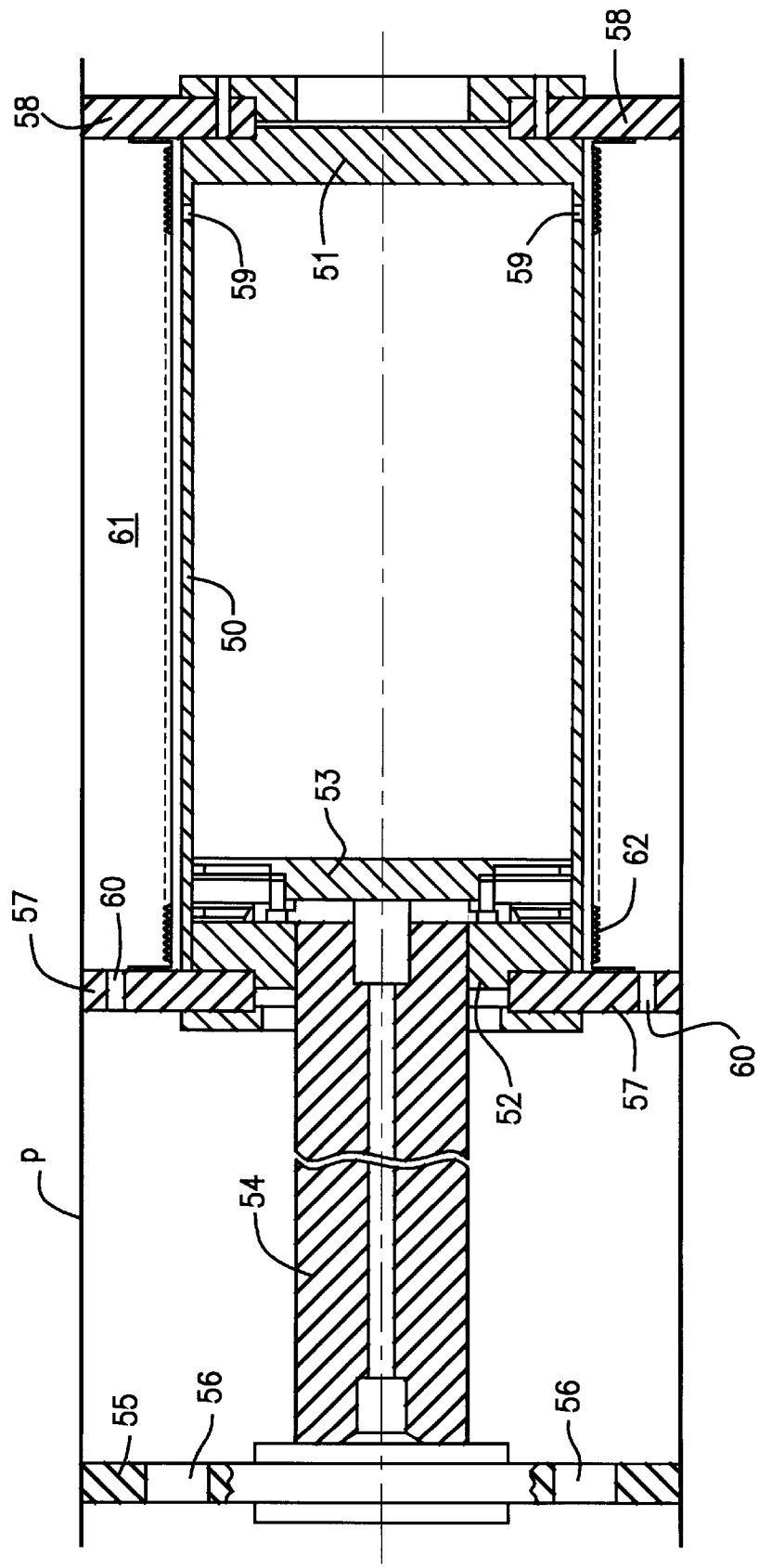
FIG. 9 is a longitudinal sectional view similar to that of FIG. 9 but showing a further embodiment of the present invention.

FIG. 9, shows another embodiment which presents a modification of the embodiment of FIG. 8. Reference number 50 designates the body which is cylindric inside and outside and is closed in a watertight fashion at its front end by an end wall 51 and by a rear end wall 52. Disposed slidably within the body 50 is a piston 53. The rearwards facing end of the piston 53 is provided with a flexible piston rod 54 which is slidable along the axis of the body 50 through an opening in the rear wall 52. The rear end of the piston rod 54 is provided with a braking ring mounting assembly. The assembly holds a braking ring 55 in place.

As in the preceding embodiments, the braking ring 55 is of the dimensions and shape designed to permit a smooth sliding motion of the ring 55 in one axial direction of the pipeline P but to provide a braking or even locking effect when urged to move in the opposite direction. The ring 55 is free to move to the right of FIG. 9 but resists the movement to the left of the Figure. The braking ring includes passages in the form of peripherally disposed openings 56.

Accordingly, hydraulic pressure applied to the left hand face of the braking ring 55 is freely transmitted to the right of the ring 55 and through bidirectional rings 57, 58 to the body 50. The rings are made from a resilient polymeric material.

As in the immediately preceding embodiment, the body 50 is filled with clean water and thus presents a reservoir section of an overall system of a source of clean process water. The wall of the body 50 has near the front end wall 51 one or more ports such as ports 59. As already mentioned the bidirectional guide ring 58 is fixedly secured to the body 50 at a front end thereof and another bidirectional guide ring 57 is secured to the body 50 at the rear end thereof. Note small passages 60 in the bidirectional ring 57. The bidirectional rings 57, 58 form axial ends of an interspace 61.

Thus, in general terms, the rings 58, 57 and 55 form what can also be generally referred to as "guide means for sliding movement of the plug along and within the pipeline."

A hose-like lining member 62 made of a suitable flexible polymeric material, is secured in a watertight fashion to the body 50 and to the rings 57, 58.

The size of the lining member 62 is determined such as to provide enough material for extending radially between the rings 57, 58 and axially along the inner wall of the pipeline P to encompass all of the water coming through the ports 59. In general terms, therefore, as in the immediately preceding embodiment, there is a flexible, water impermeable distendable lining 62 within said interspace 61 between the body 50 and the inner surface of the wall of the pipeline P. The lining is hydraulically connected, at its surface facing said body 50, with clean water supply means 50, 53, 54, 55 at a discharge end of said ports 59, whereby, on actuation of the piston means, the lining is distended by the process water and provides a water impermeable isolation of said interspace at the inner surface of the wall of the pipeline P.

As in the immediately preceding embodiment, the lining member is optional and may be omitted in certain applications.

As mentioned at the outset, a section of pipeline to be provided with a solid phase or frozen plug is normally filled with water. Inevitably, the water is contaminated with oil and wax particles which tend to rise to the vertically upper portion of the pipeline and remain there, while the lower parts of the water fill in the pipeline is relatively clean and devoid of such contaminants. Typically, the body or bodies 10, 10A are filled with clean water.

The operation of the embodiments of FIG. 1 is apparent from FIGS. 1–3. The plug shown is brought to a predetermined point within the pipeline 11 by manipulating the pressure and the flow of water inside the pipeline. In particular, when the pressure to the left of the tandem assembly shown is higher at the left hand side of FIG. 1, the entire assembly will have arrived at the position of FIG. 1 from the left of such figure. During this motion, the braking rings 23, 23A, which may somewhat resist the sliding movement, are urged to the left of FIG. 1 into abutment with the rear rings 19, 19A.

In a second step of the cycle, the pressure is reversed, whereby the pressure at the front, i.e. at the bumper 18 end, is higher than that at the back. This results in the sliding motion of the assembly to the left of FIG. 1 to the position shown in FIG. 2. In other words, the bodies 10, 10A move, owing to the sliding of the bidirectional rings 16, 19, 16A, 19A, to the left of FIG. 1. At the same time, the movement of the braking rings 23, 23A is blocked due to their increased outer diameter. This results in a relative sliding motion of the ring 23, 23A along the outside surface of the body 10. As a result, the rings 23, 23A first release the opening of the ports 21, 21A so that the ports 21, 21A now communicate the interior of the body 10, 10A.

Continued movement of the bodies 10, 10A through the braking rings 23, 23A generates a draw or suction effect at the left of the braking rings. This results in the clean water from within the body 10, 10A being drawn into the interspace 12, 12A. Simultaneously, as the body 10, 10A and thus the rear bidirectional rings 19 move to the left, they sweep or scrape the inner surface of the pipeline just before it moves into the interspace now filled with clean water thus removing substantial part of the contaminants. As a result, the water in the interspace 12, 12A is relatively clean. The possibly contaminated water to the right of the braking ring 23, 23A is simultaneously pushed out of the interspace 12 through the discharge ports 22, 22A in the bidirectional ring 16, 16A.

Eventually, the relative position between the braking ring 23, 23A and the body is as shown in FIG. 3. The interspace is now filled with clean water which more readily forms a frozen, solid state than water contaminated with various impurities such as oil droplets or wax. The pipeline can now be subjected, at its exterior, to the freezing temperature by known method, e.g. by the method of the U.S. Patent referred to above. As the volume of water to freeze is only that in the interspace, only a fraction of time of the regular freezing of the entire cross-section of the pipeline, has to be solidified. The rest of the plug, i.e. the interior of the body provides a barrier but does not have to be solidified. The solidified annular outer section provides sufficient strength of engagement with the pipeline to hold the plug in place.

The same time savings are achieved when the plug is to be unfrozen as, again only a relatively small volume of ice has to be treated.

The operation of the plug of FIGS. 4–7 is very similar as far as the motion and drawing effect of the rings 16B, 19B and 23B is concerned. However, the axial displacement of the braking ring 23B is now arranged to draw water from outside the plug. The arrangement of the ballast 29 (shown only in FIG. 4 but present throughout FIGS. 5–7) at the end of the suction hose 28 secures that water is drawn into the interspace 12B from the vertically lowermost part of the pipeline 11B, where it is generally free of the usual contaminants which tend to float upwards. Instead of discharging the contaminated water from the space to the right of the braking ring 23B through the ports in the front bidirectional ring 16B, the contaminated water is forced through the ports 22B into the interior of the body 10B with the result that the likelihood of possible entry of contaminated water from the interior of the body 10B into the interspace is virtually eliminated.

The embodiment of FIG. 8 operates in a more substantially different fashion. Here the clean water used in freezing within the interspace 43 is entirely and permanently isolated from the contaminated water in the pipeline. The interior of the body 31 is filled with clean water.

As in the first two embodiments, the left end of the plug is subjected to an increased pressure to bring same to the to the desired location. The plug slides through the pipeline on the rings 38, 40 and 41. When in place, the pressure is reversed. The reversed pressure is primarily active at the forward bidirectional ring 38 with the result that the piston 34 moves to the left of FIG. 8. The braking ring 40 effectively blocks the displacement of the body 31 to the left of FIG. 8. Thus, the piston 34 causes flow or injection of the clean water from inside the body 31 via the ports 39 under the flexible, resilient and distendable sheet or lining 44. The lining is eventually distended into contact with surfaces of the interspace 43. The contaminated water from the interspace 43, present at the outer face of the distendable sleeve 44 is forced between the resilient polymeric, rings 42, 41 and the inside surface of the pipeline P into the pipeline space outside of the plug as the pressure to the right of the plug is greater than that at the left hand side of FIG. 8.

The operation of the embodiment of FIG. 9 is very similar to that of FIG. 8. The difference is in that the direction of the braking effect of the braking ring 55 of FIG. 9 is such that on sliding movement of the plug to the desired location, the piston 53 is maintained in its left-most, inoperative position. On reversal of the pressure within the pipeline P, the entire body 50 becomes displaced against the now blocked or at least braked piston rod 54 to urge the piston 53 to inject clean water from within the body 50 under the lining 62. The passages 60 serve the purpose of aiding in evacuation of contaminated water from the interspace 61 while the lining 62 is being distended by the water injected through ports 59. The passages 60 may also leave some of the pressure causing the transport of the icepig to the desired location to be reduced at the guide ring 57 in comparison with the guide ring 58.

As already mentioned, the lining in the last two embodiments is optional. Without the lining, the operation would however be generally as described except that instead of the lining distended and thus encompassing a gradually increased volume it would only be the clean water coming through the respective ports 39, 59 which would press out the water left in the interspace. Besides, particularly in the embodiment of FIG. 9, the ring 57 would sweep major part of any contaminants away and prevent them from entering the interspace 61.

It will be appreciated that further embodiments of the icepig may exist departing from those described without departing from the present invention as recited in the accompanying claims.

We claim:

1. A plug for forming a barrier in a pipeline section filled with water, for inspection, maintenance or the like purposes, comprising, in combination:

(a) a hollow, generally cylindric body having an outside diameter smaller than the inside diameter of the pipeline section, to define an annular interspace of a predetermined thickness between the inner wall of the pipeline and the outer wall of the body section, said body including a closed front end portion and an open rear end portion;

(b) a first ring secured to said front end portion and having an outside diameter corresponding to the inside diameter of the pipeline section, for slidingly guiding the front end portion of the body along the pipeline section;

(c) a second ring secured to said rear end portion and having an outside diameter corresponding to the inside diameter of the pipeline section, for slidingly guiding the rear end portion of the body along the pipeline section;

(d) end members defining axial ends of said interspace;

(e) water inlet port means communicating said interspace with a source of clean water; and (f) water supply means for selectively drawing clean water into said interspace through said inlet port means; whereby, on applying a freezing temperature at the outside of said pipeline section, the clean water in the interspace forms an annular solid ice plug defining, together with said body, a barrier in said pipeline section.

2. The plug as recited in claim 1, wherein said front and said rear rings are each a bidirectional ring slidable along the pipeline section in both directions longitudinally of said body.

3. The plug of claim 2, wherein discharge ports are provided at the front end portion of the plug for discharge of water from said interspace.

4. The plug of claim 3, wherein said water supply means includes a braking ring slidably mounted in a watertight fashion on said body and having an outer periphery in a unidirectional braking arrangement with said inner wall of said pipeline section, whereby the outer periphery of said braking ring is smoothly-slidable relative to the pipeline section only in a forward direction, i.e. the direction from said rear ring to said front ring, but becomes braked relative to the pipeline section when urged in an opposite, rearward direction.

5. The plug of claim 4, wherein said braking ring includes passage blocking portion adapted to block said water inlet port means when the braking ring is at said rear end portion of the body, and to open said port means when the braking ring is away from said rear end portion.

6. The plug of claim 5, wherein the passage blocking portion is integrally formed with said braking ring.

7. The ice plug of claim 3, wherein said discharge ports communicate said interspace with the interior of said body.

8. The ice plug of claim 1, wherein said water supply means includes a fitting having an inlet portion open to the exterior of said plug at a rear end thereof, and a discharge end, communicating with said interspace at a point near the rear end of the plug.

9. The ice plug of claim 8, wherein said fitting is connected in a liquid tight fashion to a downstream end of a flexible hose, the upstream end of said hose being provided with a ballast adapted to maintain the upstream end of the hose at a vertically lowermost portion of the interior of the pipeline, whereby water drawn by said draw means through the conduit and the fitting into the interspace is taken from the pipeline outside of the plug at a lowermost location and therefore has a relatively small content of contaminants such as oil droplets or wax particles.

10. The ice plug of claim 1, wherein said water supply means includes a reservoir section for clean process water disposed within said body and isolated in a liquid tight manner from the exterior of the plug.

11. The plug of claim 1, wherein said source of clean water is the interior of said body.

12. The plug of claim 1, wherein said source of clean water is a lower part of said pipeline section exteriorly of said plug.

13. The plug of claim 1, wherein said plug is a leading plug section, connected to a tandem plug section, a first end of a connection tubing being secured to said open rear end portion, a second end of said connection tubing being secured to a tandem plug section, said tandem plug section including:
(a) a hollow, generally cylindric body having an outside diameter smaller than the inside diameter of the pipeline section, to define an annular interspace of a predetermined thickness between the inner wall of the pipeline and the outer wall of the body section, said body including a closed front end portion in hydraulic communication, through said tubing, with the interior of the body of said leading plug section, the body of the tandem section further including an open rear end portion;
(b) a first ring secured to said front end portion and having an outside diameter corresponding to the inside diameter of the pipeline section, for slidingly guiding the front end portion of the body along the pipeline section;
(c) a second ring secured to said rear end portion and having an outside diameter corresponding to the inside diameter of the pipeline section, for slidingly guiding the rear end portion of the body along the pipeline section;
(d) said first and second rings defining axial ends of said interspace;
(e) water inlet port means communicating said interspace with a source of clean water; and
(f) water supply means for selectively drawing clean water into said interspace;
whereby said tandem plug section is of a generally identical structure with said leading plug section.

14. An ice plug for defining a barrier in a pipeline section filled with water, for inspection, maintenance or the like purposes, said ice plug comprising:
(a) a hollow, generally cylindrical body enclosed at a front end thereof and provided with guide means for sliding movement of the plug along and within the pipeline, said body having a diameter smaller than that of the pipeline to define with the latter an annular interspace enclosed at opposed axial ends of the plug and having thickness required for forming a continuous, annular ice layer firmly engaging the inside wall of the pipeline and the outer surface of said body to thus form, together with the body, a temporary water impermeable plug within the pipeline; and
(b) water supply means for filling said interspace with process water.

15. The ice plug of claim 14, wherein said water supply means comprises a fitting having an inlet portion open to the exterior of said plug at a rear end thereof, and a discharge end, communicating with said interspace at a point near the rear end of the plug.

16. The ice plug of claim 15, wherein said fitting is connected in liquid tight fashion to a downstream end of a conduit, the upstream end of said conduit being provided with a ballast adapted to maintain the upstream end of the conduit at vertically lowermost portion of the interior of the pipeline, whereby water drawn by said draw means through the conduit and the fitting into the interspace is taken from the pipeline outside of the plug at a lowermost location and therefore has a relatively small content of contaminants such as oil droplets or wax particles.

17. The ice plug of claim 15, further comprising drains disposed near the front end of the body and communicating said interspace with the interior of said body.

18. An ice plug for defining a barrier in a pipeline section filled with water, for inspection, maintenance or the like purposes, said ice plug including:
(a) a hollow, generally cylindrical body enclosed at a front wall and at a rear wall thereof and provided with guide means for sliding movement of the plug along and within the pipeline, said body having an outer diameter smaller than the inside diameter of the pipeline to define with the inner wall of the pipeline an annular interspace enclosed at opposed axial ends of the plug and having thickness required for forming an annular ice layer firmly engaging the inside wall of the pipeline and the outer surface of said body to thus form, together with the body, a water impermeable plug within the pipeline;
(b) water supply means for filling said interspace with clean process water;
(c) said water supply means including a reservoir section for clean process water and a filling port communicating the reservoir with said interspace, said reservoir section being disposed inside the body and isolated in a liquid tight manner from the exterior of the plug; and
(d) piston means adapted to force the process water from said reservoir section into the interspace.

19. The plug of claim 18, further comprising a flexible, water impermeable distendable lining within said interspace between the body and the inner surface of the pipeline wall, hydraulically connected, at its surface facing said body, with said water supply means at a discharge end of said filling port, whereby, on actuation of the piston means, the lining is distended by the process water and provides a water impermeable isolation of said interspace at the inner surface of the wall of the pipeline.

20. The plug of claim 19, wherein said piston means includes a piston rod projecting through said front wall of the body and having a solid, water impermeable forward piston assembly slidable relative to the interior surface of the pipeline.

21. The plug of claim 19, wherein
(a) said piston means includes a piston sealingly slidably movable within said body, the piston being secured to a front end of a piston rod projecting through said rear wall of the body;
(b) said piston rod having a braking ring assembly at a rear, free end thereof;
(c) said braking ring mounting assembly including
(i) a braking ring made of a resilient polymeric material and adapted to permit a generally smooth sliding movement of the ring in a forward direction corresponding to the direction from said rear wall to said front wall;

(ii) passages allowing generally free flow of liquid from one axial face of the braking ring assembly to the other;

(d) said guide means including a front bidirectional guide ring secured to a front end of the body, and a rear bidirectional guide ring secured to a rear end of the body, both said bidirectional guide rings being adapted for a smooth gliding movement along said pipeline section in both axial directions;

(e) said piston means further includes a piston sealingly slidably movable within said body;

(f) said filling port being located near said front wall of the body.

22. The plug of claim 18, wherein said piston means includes a piston rod projecting through said front wall of the body and having a solid, water impermeable forward piston assembly slidable relative to the interior surface of the pipeline.

23. The plug of claim 18, wherein (a) said piston means includes a piston sealingly slidably movable within said body, the piston being secured to a front end of a piston rod projecting through said rear wall of the body;

(b) said piston rod having a braking ring assembly at a rear, free end thereof;

(c) said braking ring mounting assembly including (i) a braking ring made of a resilient polymeric material and adapted to permit a generally smooth sliding movement of the ring in a forward direction corresponding to the direction from said rear wall to said front wall;

(ii) passages allowing generally free flow of liquid from one axial face of the braking ring assembly to the other;

(d) said guide means including a front bidirectional guide ring secured to a front end of the body, and a rear bidirectional guide ring secured to a rear end of the body, both said bidirectional guide rings being adapted for a smooth gliding movement along said pipeline section in both axial directions;

(e) said piston means further includes a piston sealingly slidably movable within said body;

(f) said filling port being located near said front wall of the body.

* * * * *